June 2, 1959     F. A. PACHMAYR     2,888,853
LOCK NUT UTILIZING A COILED SPRING
Filed Feb. 28, 1957
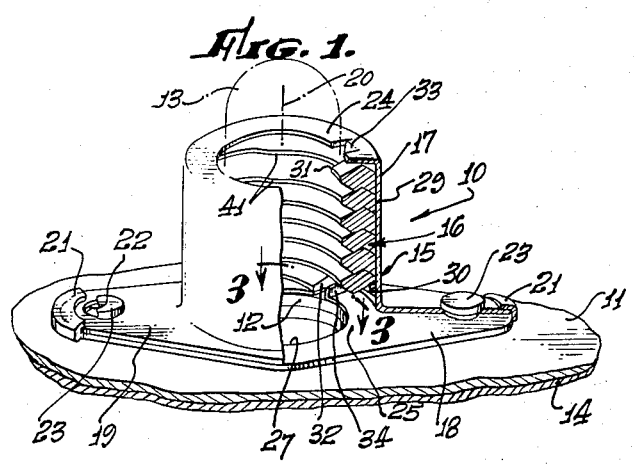
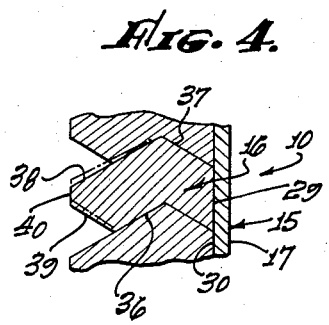
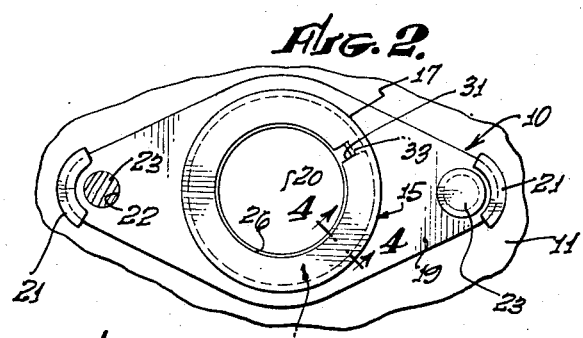
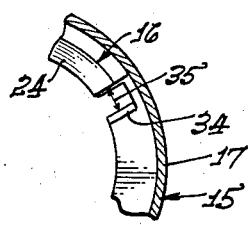
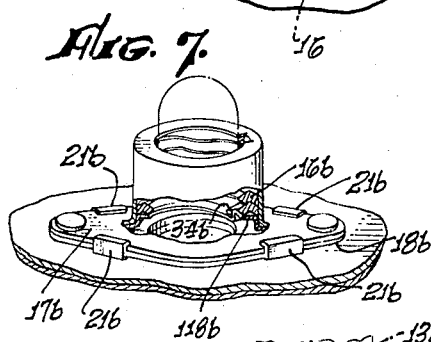
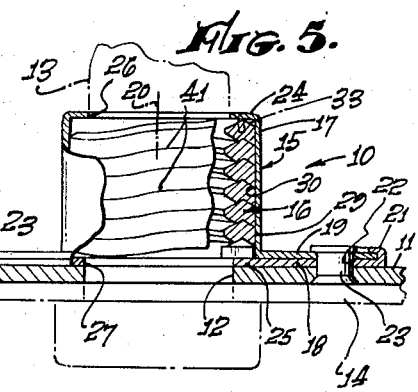
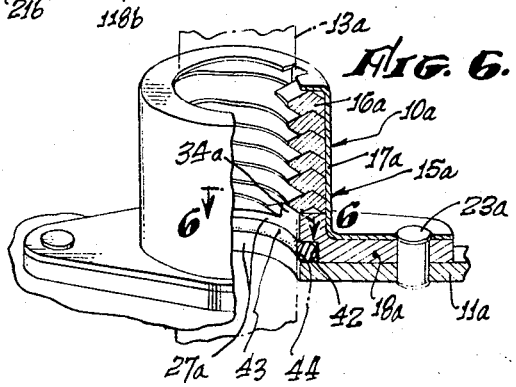
Frank A. Pachmayr,
INVENTOR.
By William P. Green
ATTORNEY.

United States Patent Office 2,888,853
Patented June 2, 1959

2,888,853

LOCK NUT UTILIZING A COILED SPRING

Frank A. Pachmayr, Los Angeles, Calif., assignor, by mesne assignments, to Mark Hattan, Pasadena, Calif.

Application February 28, 1957, Serial No. 643,182

2 Claims. (Cl. 85—32)

This invention relates to improved lock nuts for threadedly engaging and tightly gripping a coating stud. The present application is a continuation-in-part of my copending application Serial No. 540,298, filed October 13, 1955, on "Coiled Spring Lock Nut," now Patent No. 2,794,495.

A lock nut embodying the present invention is of a type including a helically coiled spring which is contained within and carried by a small tubular housing or body. The spring is confined and retained by the body, and functions as a resilient internal thread for threadedly engaging a coating stud. The resilience of the spring is utilized to provide a gripping action for tightly frictionally engaging the stud, to give the device a lock nut action.

In prior lock nuts of this general type, it has normally been necessary to form the outer housing to have considerable wall thickness and strength, in order to withstand the radial expanding forces which are exerted against the housing by the coiled member when the stud is connected into that member. These radial forces are increased when the coiled member is free for slight shifting or creeping movement within and relative to the housing, since the stud may then have a very decided tendency to radially expand the entire coiled member. On the other hand, it is desirable that the coiled member be free for such slight shifting movement in the housing in order to assure the capacity of the coiled member to conform to and tightly grip the stud. This is particularly true where the various turns of the stud are so shaped as to have an axially waving configuration as they advance helically, as taught in Patent No. 2,464,808 issued March 22, 1949, to Mark Hattan. Where this axially waving configuration is utilized, the lock nut action is attained by reason of the partial straightening of the waves by engagement with the stud threads, and such partial straightening necessitates a capacity for slight shifting or creeping of the turns of the coiled members.

The general object of the present invention is to provide improvements in the above discussed general type of lock nut, which will allow for the use of a much lighter outer housing or body than has heretofore been employed. Specifically, this result is attained by so designing the helical spring element that this element has, in itself, a considerably increased resistance to unwanted deformation, especially to radial spreading or expansion. This increased inherent stability of the spring element reduces to a minimum the radial forces exerted outwardly against the outer housing, so that a very thin walled housing may be utilized, typically formed of thin sheet metal stamped to the desired shape.

In order to attain such added spring stability, I so form the spring that its adjacent turns will nest axially together, in a manner interlocking the turns against relative radial movement. That is, each turn may have a projection extending axially into a mating recess in an adjacent turn, and adapted to bear radially against a wall or walls of the recess to radially interlock the turns. Thus, each turn is held against expansion by the other turns, and the overall result is a very stable unit which is capable of withstanding spreading and other distorting forces and will not transmit most of those forces to the outer housing.

To allow for maximum effectiveness of interlock between turns, and to facilitate formation of the spring, the interfitting projection and recess preferably extend helically along the coiled spring member, and desirably along its entire helical extent. The projection may be formed at one axial side of the coiled element, while the recess is at the other side. Particularly contemplated is an arrangement in which the coiled spring element is of essentially V-shaped cross sectional configuration, to present a V-shaped projection at one side and a correspondingly shaped recess at the other side.

The above and other features of the present invention will be better understood from the following detailed description of the typical embodiments illustrated in the accompanying drawing in which:

Fig. 1 is a perspective view, partially broken away, of a first form of lock nut constructed in accordance with the invention.

Fig. 2 is a plan view of the Fig. 1 lock nut;

Fig. 3 is an enlarged fragmentary transverse section taken on line 3—3 of Fig. 1;

Fig. 4 is an enlarged fragmentary axial section taken on line 4—4 of Fig. 2;

Fig. 5 is a side view of the Fig. 1 device, with the outer housing broken away to illustrate the axially waving configuration of the inner helical coiled member;

Fig. 6 is a view corresponding to Fig. 1, but showing a variational form of lock nut embodying the invention; and Fig. 7 is a similar view showing another form of the invention.

Referring first to Figs. 1–5, the lock nut 10 there shown is applied to a plate 11 which contains an opening 12 through which a threaded stud 13 projects for threadedly connecting to the nut. Stud 13 may typically be utilized for attaching a second plate 14 or other element to the outer side of the plate 11 which carries nut 10.

The nut 10 includes an outer hollow essentially tubular housing 15, within which there is contained a helically coiled spring element 16 forming the threads for engaging stud 13. Housing 15 may typically be formed of thin sheet metal, and more specifically, of two sheet metal sections 17 and 18. Section 17 is tubular and cylindrical along the major portion of its axial extent, and has a base flange 19 which extends radially outwardly and directly transversely of the axis 20 of the stud and nut. This planar flange 19 of body section 17 extends across and engages the upper side of the lower base plate section 18 of the body or housing, which section 18 also extends directly transversely of axis 20. Section 18 may have a pair of ears or tabs 21 at its opposite ends, turned upwardly and then horizontally inwardly to overlie the opposite end portions of flange 19, and thereby fasten the two body or housing sections 17 and 18 together in fixed relation. Registering apertures 22 are provided in flange 19 and lower body section 18, for passing rivets 23 to attach the nut unit to the carrying plate 11.

The inner coiled spring element 16 of nut 10 is formed of a single elongated strip or wire wound helically as shown about axis 20 and at a pitch corresponding substantially to the pitch of the threads of stud 13, so that helical element 16 itself functions as a thread for engaging the stud threads. The coil formed by element 16 is closely wound, having its adjacent turns in direct axially abutting engagement, and is formed of a resilient spring material, such as a suitable stainless steel or spring type carbon steel. The helical element 16 is confined axially between an inturned transverse annular flange or shoulder 24 formed by the upper portion of body section 17, and a radially inner portion 25 of body section 18. These portions 24 and 25 of the body which axially confine spring element 16 both extend directly transversely of axis 20, and project inwardly beyond the main cylindrical portion of body section 17 for a radial distance which is sufficiently great to assure the proper retention of element 16, but which still is not great enough to cause these portions 24 and 25 of the body to interfere with insertion and removal of the stud. As will be apparent, the openings 26 and 27 within portions 24 and 25 are circular and centered about axis 20, and are of a diameter slightly greater than the maximum diameter of the threads of stud 13.

The radially outer sides or surfaces 29 of the various turns of element 16 are cylindrically curved and complimentary, to form together an outer cylindrical surface centered about the axis 20 of the nut and engaging radially outwardly against the correspondingly shaped cylindrical inner surface 30 of portion 17 of the body or housing. Element 16 is free for slight limited shifting movement within and relative to body 15. More specifically, element 16 may be free for very slight axial movement, if desired, and is free for slight rotary movement about axis 20. The rotary movement is limited by engagement of the two end surfaces 31 and 32 of element 16 with a pair of axially turned ears or tabs 33 and 34 formed by housing portions 24 and 25 respectively. Surfaces 31 and 32 lie in planes which extend directly axially of the nut, and which may contain the axis 20. The engaged surfaces of tabs 33 and 34 may also extend directly axially, to positively limit the rotation of the element 16 within the outer housing. The extent to which the helical element 16 is free to turn within body 15, or to elongate in the direction of its helical extent, is indicated by the spacing at 35 between the lower end surface 32 of element 16 and the associated shoulder or tab 34 (see Fig. 3).

In order to effectively maintain the various turns of helical element 16 against any tendency for relative radial movement, and particularly to prevent the exertion of spreading or expanding forces radially outwardly against body section 17 under the influence of the forces exerted against the coil member 16 when stud 13 is tightened, the element 16 is given a cross-sectional configuration which allows each turn to nest axially within the next successive or adjacent turn and thus hold the turns in their desired interfitting relation. As best seen in Fig. 4, element 16 may have a substantially V-shaped cross sectional configuration, which is desirably the same along the entire length of element 16, so that each turn of this helical element has at one side a V-shaped axially facing recess 36 extending longitudinally of the elongated thread forming element 16. At the opposite side of each turn of element 16, this V-shaped element forms an axially extending projection 37 which is shaped substantially the same as recess 36, and fits into that recess of the adjacent turn in nesting relation. This projection 37 on each turn of the coiled element is adapted to bear both radially inwardly and radially outwardly against the inner and outer walls of the V-shaped recess into which the projection fits, so that the adjacent turns are not free to move relatively in either radial direction'

The radially inner extremities of the various turns of coiled element 16 are shaped in correspondence with the threads of the mating stud 13, to form together an inner threaded bore through the nut into which the stud may be screwed. More particularly, the threads of the nut may be formed by two angularly disposed surfaces 38 and 39, the former of which may be an inner continuation of one of the sides of projection 37, and the latter of which may be a surface extending angularly inwardly from the inner extremity of one of the walls of recess 36. Thread surfaces 38 and 39, in tapering radially inwardly to the peaks 40 of the threads, may be disposed at the usual angle of 60° relative to each other. If desired, element 16 may be so formed that the load bearing surfaces 38 of the nut threads will be at a very slightly greater angle to axis 20 than are the surfaces 39, so that the turns of element 15 may be slightly resiliently deformed downwardly when stud 13 is tightened, to then cause the stud and nut threads to mesh perfectly. This slight deformation is represented in Fig. 4, in which the broken lines represent the position to which one of the turns of element 16 normally returns under its own resilience, while the full lines represent the position to which the thread element is slightly deformed when in use.

The element 16 desirably has at least about six turns. The material of this element must of course be sufficiently strong and resistant to deformation to maintain the threaded connection with stud 13 under the forces exerted against the nut by the stud when the former is tightened. In order that the nut may serve to grip the stud threads very tightly in the manner of a lock nut, the various turns of element 16 are given an axially waving configuration, longitudinally of the elongated helical element 16, and in addition to its helical curvature. This waving configuration is brought out best in Fig. 5. As seen in that figure, the individual turns are deformed to wave axially at 41 out of the true helical path defined by the stud threads, so that the helical threads of the stud tend to deform the waves in element 16 from their waving configuration to or toward a true helical course. The resilience of the various turns of element 16, however, always urges the initially waved portions of those turns back toward their waved condition, so that these waving areas resiliently bear tightly against the engaged thread surfaces on the stud, to cause a tight holding action between the stud and nut. Desirably, the waves in the various turns in element 16 are all identical and aligned axially of the nut, so that the waved portions of the nut turns will nest one within the other. There may typically be four waves formed in each turn of the coil.

In using the nut 10 of Figs. 1 to 5, stud 13 may be screwed into the nut to retain element 14 against plate 11 to which the nut is attached. The resilience of element 16, together with the axially waving configuration of the turns of that element cause the various turns to tightly bear against the stud threads and function as a lock nut for holding the stud in any position to which it is turned. During tightening of the stud into the nut, the element 16 is free for slight shifting movement relative to outer body section 17, during which movement the engaging cylindrical surfaces 29 and 30 of the two parts shift relative to and along each other slightly. This slight shifting of the inner element 16 allows that element to conform freely to the stud, and to extend to a slightly increased length along its helical extent as waving portions 41 are deformed toward a true helical path. The nesting or interfitting relationship between the various axially adjacent turns of element 16 causes those turns to interfit in a manner preventing the exertion of excessive spreading or expanding forces radially outwardly against body section 17 as a result of the insertion of stud 13 into the nut. In order to maximize this effect, the projection 37 of each turn of element 16 preferably projects rather far into the recess 36 of the adjacent turn, desirably to a location substantially radially opposite the peak 40 of that adjacent turn, as seen in Fig. 4.

Fig. 6 represents another form of lock nut 10a, which is the same as that of Figs. 1 to 5 except as to the manner of formation of the lower base plate section 18a of the nut housing 15a. In Fig. 6, this base plate 18a is a forging or casting, on which the upturned ear 34a for limiting rotation of element 16a is made considerably heavier than the ear 34 of Figs. 1 to 5. Also, base plate 18a of Fig. 6 has an annular recess 42 containing an elastically deformable seal ring or O-ring 43 formed of rubber or the like, which seal ring projects inwardly beyond the radially inner cylindrical surfaces 27a of plate 18a and mounting plate 11a to a diameter to engage and form a fluid tight seal with an outer cylinder surface 44 on stud 13a. Ring 43 also annularly engages parts 18a and 11a in fluid tight sealing relation, to thus prevent the passage of any fluid past ring 43, either axially inwardly or outwardly. The manner of formation of element 16a in Fig. 6 is the same as the manner of formation of element 16 of the first form of the invention, and as in the first form of the invention, the element 16a is free for limited shifting movement and for limited extension helically upon insertion of the stud into the nut. Body parts 17a and 18a of the Fig. 6 device may be rigidly attached to carrier member 11a by rivets 23a.

Fig. 7 shows fragmentarily a further variational form of the invention, which is identical with that of Fig. 1 except in the respects discussed below. In the first place, the tabs 21b of Fig. 7, corresponding to tabs 21 of Fig. 1, are formed along the opposite sides of bottom section 18b of the body, rather than at its opposite ends, and these tabs overlap corresponding side portions of upper body member 17b. Also, the lower section 18b is deformed upwardly at 118b, radially inwardly of section 17b, to form an essentially helical ramp or support surface having a helical pitch the same as the primary pitch of spring 16b, and engageable with the lower turn of the spring along an extended area to take the forces exerted downwardly by the spring. Helical surface or portion 118b extends about substantially the entire circular extent of element 18b, and terminates at its opposite ends in an axially extending shoulder 34b corresponding to and serving the function of shoulder 34 in Fig. 1.

I claim:

1. A lock nut for threadedly engaging a coacting stud and adapted to bear axially against a work piece when the nut and stud are tightened relative to one another; said nut comprising a hollow essentially tubular outer body having a cylindrical inner surface, an elongated helically coiled thread structure of resilient spring material within said body having an inner portion forming an essentially helical internal thread adapted to threadedly engage said coacting stud, said resilient coiled thread structure having portions which are normally shaped to have a waving configuration in addition to their helical curvature and as they extend helically to thereby have a self-locking action with the stud, the waves of successive turns of said thread structure being axially aligned with one another and nesting axially into one another, said successive turns of the thread being normally in direct contact with one another through substantially the entire 360 degrees circular extent of the turns, said coiled thread structure having a radially outwardly facing substantially cylindrical surface bearing outwardly against said inner substantially cylindrical surface of said body and free for slight shifting and sliding movement relative thereto so that the thread structure may shift slightly relative to the body in mating with and conforming to the stud, and means holding the thread structure in said body and limiting said shifting movement thereof relative to the body, said last mentioned means including an element formed separately from said outer body and attached to a first end thereof in fixed position relative thereto, said element having a portion projecting axially into the interior of said tubular body forming an axially inwardly facing ramp within the body having an essentially helical curvature corresponding essentially to that of an end turn of said end thread structure and against which said end turn bears axially toward said work piece upon relative tightening of the stud and nut, said element having a surface at its opposite axially outer side projecting axially in the direction of the work piece at least as far as the extremity of said body at that end thereof and adapted to bear tightly against said work piece upon said tightening of the stud and nut to thereby transmit the holding force of the nut from the thread structure to the work piece directly through said element, said portion of the element which projects into the body forming an essentially axially extending shoulder within the interior of the body engageable with an end of said thread structure and holding the latter against turning movement in a first direction relative to said element upon said relative tightening of the stud and nut, and said means including means carried by the body at its second end and engageable with a second end of the thread structure in a relation preventing movement of the thread structure out of that end of the body and limiting rotary shifting movement of the thread structure relative to the body in a second rotary direction.

2. A lock nut as recited in claim 1, in which said ramp extends essentially helically through substantially 360 circular degrees, said shoulder extending essentially axially between two opposite ends of said essentially helical ramp surface, said element having a second portion axially beyond said body forming a flange projecting radially outwardly beyond said first portion.

References Cited in the file of this patent

UNITED STATES PATENTS

| | | |
|---|---|---|
| 2,386,197 | Dawson | Oct. 9, 1945 |
| 2,672,070 | Foster | Mar. 16, 1954 |
| 2,775,992 | Smith | Jan. 1, 1957 |
| 2,794,475 | Pachmayr | June 4, 1957 |